United States Patent
Bretzner et al.

(10) Patent No.: US 7,962,250 B2
(45) Date of Patent: Jun. 14, 2011

(54) CONTROL METHOD FOR COOLING AN INDUSTRIAL PLANT

(75) Inventors: Thomas Bretzner, Wendelstein (DE); Günter Eckert, Schwanstetten (DE); Walter Rebling, Nürnberg (DE); Helmut Theurer, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 12/096,315

(22) PCT Filed: Dec. 6, 2006

(86) PCT No.: PCT/EP2006/069383
§ 371 (c)(1),
(2), (4) Date: Jun. 5, 2008

(87) PCT Pub. No.: WO2007/068639
PCT Pub. Date: Jun. 21, 2007

(65) Prior Publication Data
US 2008/0294297 A1    Nov. 27, 2008

(30) Foreign Application Priority Data

Dec. 13, 2005  (DE) .................. 10 2005 060 635

(51) Int. Cl.
*G05D 23/00* (2006.01)
*G05D 3/12* (2006.01)
*G05B 19/04* (2006.01)
*G05D 23/32* (2006.01)

(52) U.S. Cl. .......... 700/300; 62/157; 700/299; 700/286; 700/280; 700/276; 700/253; 700/174

(58) Field of Classification Search .................. 700/300, 700/174, 276, 286, 253, 280, 299; 62/157
See application file for complete search history.

(56) References Cited

U.S. PATENT DOCUMENTS

| 3,945,432 | A | * | 3/1976 | Tamblyn ................. 165/210 |
| 5,646,870 | A | * | 7/1997 | Krivokapic et al. ........... 716/4 |
| 5,710,533 | A | | 1/1998 | Pla et al. |
| 5,799,496 | A | | 9/1998 | Park et al. |

(Continued)

FOREIGN PATENT DOCUMENTS

DE    3309724 C2    8/1984

(Continued)

OTHER PUBLICATIONS

Stirl et al., "Experienced-based Evaluation of Economic Benefits of On-line Monitoring Systems for Power Transformers" 2002, Cigre p. 1-8.*

(Continued)

*Primary Examiner* — Albert Decady
*Assistant Examiner* — Thomas Stevens
(74) *Attorney, Agent, or Firm* — Laurence A. Greenberg; Werner H. Stemer; Ralph E. Locher

(57) ABSTRACT

A method for controlling the cooling of an industrial plant with at least one electrical component, such as, for example, a transformer, and having at least one cooling element for cooling the electrical components, uses at least one sensor for measuring the temperature and/or the viscosity of the coolant in the cooling system. An optimal control of the cooling system can be provided by way of controlling the electrical components with selected control profiles taking into account specific data for the electrical components.

11 Claims, 2 Drawing Sheets

U.S. PATENT DOCUMENTS

| | | | |
|---|---|---|---|
| 5,838,881 A | 11/1998 | Nelson et al. | |
| 6,101,824 A * | 8/2000 | Meyer et al. | 62/175 |
| 6,106,785 A * | 8/2000 | Havlena et al. | 422/109 |
| 6,446,027 B1 * | 9/2002 | O'Keeffe et al. | 702/183 |
| 6,909,349 B1 | 6/2005 | Longardner et al. | |
| 2003/0062149 A1 | 4/2003 | Goodson et al. | |
| 2003/0160104 A1 | 8/2003 | Kelly et al. | |
| 2003/0187549 A1 * | 10/2003 | Bohrer et al. | 700/276 |
| 2004/0218355 A1 | 11/2004 | Bash et al. | |
| 2005/0278071 A1 * | 12/2005 | Durham, III | 700/276 |
| 2006/0142901 A1 * | 6/2006 | Frankel et al. | 700/300 |
| 2006/0168972 A1 * | 8/2006 | Fry | 62/157 |
| 2007/0078532 A1 | 4/2007 | Fick et al. | |

FOREIGN PATENT DOCUMENTS

| | | |
|---|---|---|
| DE | 19615469 C2 | 10/1997 |
| DE | 69718373 T2 | 10/2003 |
| JP | 61172312 A | 8/1986 |
| SU | 781781 A1 | 11/1980 |
| SU | 1097976 A1 | 6/1984 |
| WO | 01/37292 A1 | 5/2001 |
| WO | 2005045535 A1 | 5/2005 |

OTHER PUBLICATIONS

Scanes-P.S., "Claimatic Design DAta for use in Thermal Calculations for Buildings—Estimated Clear Sky Solar Radiation vs Measured Solar Radiation", 1974, Pergamon Press, p. 219-226.*

J.A. Palmer and J.K. Nelson; "Intelligent control of large power transformer cooling pumps", IEE Proc-Gener. Transm. Distrib., vol. 143, No. 5, Sep. 1996, 5 pages.

International Search Report dated Mar. 26, 2007, 2 pages.

German Patent and Trademark Office Action dated Aug. 14, 2006, 5 pages.

* cited by examiner

CONTROL METHOD FOR COOLING AN INDUSTRIAL PLANT

BACKGROUND OF THE INVENTION

Field of the Invention

The invention relates to a method for controlling the cooling of an industrial plant comprising at least one electrical component and with a cooling system comprising at least one cooling element for cooling the electrical component, wherein at least one sensor measures the temperature and/or viscosity of the coolant in the cooling system.

Cooling of an electrical component, particularly of an oil transformer, is necessary due to the heat energy produced in the operation of the electrical component. In the case of an oil-cooled transformer, a cooling circuit system extending between the windings is conventionally used in which a coolant such as, e.g. a cooling air, circulates. Due to the heating of the cooling oil, heat layers are produced within the cooling circuits so that the cooling oil circulates within the cooling system.

At the same time, the cooling system is frequently connected to a heat exchanger which delivers the heat of the cooling oil as coolant to the environmental air. This heat exchange is frequently supported by additional radiators in that the volume of air which is in contact with the heat exchanger is increased. Effective cooling of an oil transformer can be provided by the coordinated control of additional oil pumps within the coolant and of the radiator performance.

This cooling system consisting of the cooling circuit for the oil, the heat exchanger and the radiators is conventionally controlled in a very simple manner. When a particular temperature level is exceeded within the cooling system, the oil pumps and/or the fans are switched in, the fans and/or the pumps only have a maximum of three power levels. These units are switched in when particular predetermined values are exceeded. The disadvantageous factor in this arrangement is, however, that these cooling units are switched in or out, respectively, only within large temperature intervals. However, this leads to considerable changes in volume of the oil level within the cooling system and the expansion vessels connected thereto. In the case of large fluctuations of the volume within the expansion vessel, so-called "breathing" of the transformer is produced as a result of which humidity increasingly enters into the coolant due to the contact with the environmental air. This leads to accelerated ageing of the coolant liquid and additionally impairs the insulating property of the cooling oil as coolant.

The temperature within the cooling system or the temperature existing in the transformer, respectively, is conventionally measured or determined indirectly. In this context, a temperature jump between the winding and the surrounding cooling system, which depends on the current within the winding, must be taken into consideration, on the one hand. This is why the transformer secondary current is used for determining the winding temperature. The transformer secondary current, in turn, feeds a heating resistor in a pointer thermometer and, as a result, produces a temperature indication corresponding to the transformer loading which, in the ideal case, corresponds to the oil temperature actually measured. On the basis of this indirect measuring method, the average or, respectively, maximum winding temperature can be mapped. In this arrangement, however, the half-current adjustments are made according to previously determined characteristics. Furthermore, the temperature jump between the winding and the surrounding coolant is calculated on the basis of the so-called rated transformer operating state. At other operating states of the transformer than the rated operating state, an unequivocal determination of the hot spot temperature is not possible since, on the one hand, the physical design model forming the basis for the rated operating state—and thus the calculation of the hot spot temperature—is not completely applicable to other operating states of the transformer. Furthermore, current state parameters of the cooling system, e.g. the number of pumps and fans currently in operation, are not interrogated and therefore the instantaneous cooling capacity is not taken into consideration in the determination of the current actual winding temperature.

BRIEF SUMMARY OF THE INVENTION

It is the object of the present invention to avoid the above-mentioned disadvantages and provide optimum cooling capacity to an industrial application during its operation at any time.

In this context, it is provided that rule-based applications and/or a neural network is used for controlling the cooling element by means of a control profile and is optimized with respect to a predetermined operating state of the electrical component.

The control profile is predetermined by the operator and is optimized with respect to a predeterminable operating state of the electrical component. Thus, e.g., the control profile can be designed in such a manner that as little noise loading as possible is produced and thus the use of fans is almost eliminated during a deviation between NOMINAL and ACTUAL temperature. The control profile can also be oriented towards a long operating time of the electrical component in that a certain temperature must not be exceeded within the electrical component.

In an advantageous embodiment of the method, it is provided that the temperature distribution within the electrical component is calculated on the basis of the measured temperature and/or viscosity and/or flow rate of the coolant and/or operating data used as a basis in the development of the electrical component.

The method according to the invention ensures that the control of the cooling elements is optimized for each individual transformer and is especially matched to the respective life of the transformer, taking into consideration the available cooling elements, the available cooling capacity, the current operating state. The control profile to be selected by the operator is used as a basis for controlling the cooling system and thus for optimally operating the transformer with regard to the selected control profile such as, e.g. controlling the transformer with regard to a maximum running time in service.

In addition, data and design values of the planning and development of the transformer are taken into consideration in the generation of the respective control profile and in the calculation of the hot spot temperature. Furthermore, deviations between calculation and real operation, already found in the transformer test department, can be implemented in the specific control profiles of the transformers.

As well, there are diagnostic capabilities about the state of the cooling system and the past, current and—using load models as a basis—also of the future operating state of the transformer. Processing these state variables of the cooling system in a database makes it possible to build up a history of the operating states. In addition, maintenance intervals can be optimally calculated and initiated by means of the actual operating state. The difference with respect to monitoring systems already on the market mainly lies in the fact that the optimization of the cooling system is focused on each specific transformer. The SIMATIC software is the essential basis for the control software.

Advantageously, for calculating the temperature distribution, the environmental temperature and the current flowing through the electrical component is measured and is included in the calculation of the temperature distribution, wherein, when predetermined threshold values are exceeded, the cooling element is regulated with a correspondingly higher cooling capacity on the basis of the selected control profile.

According to the invention, the cooling element is regulated by means of the selected control profile in such a manner that a uniform temperature distribution within the electrical component is ensured. As an alternative, the cooling element is regulated by means of the selected control profile in such a manner that a predetermined maximum temperature distribution within the electrical component is not exceeded.

In an advantageous embodiment of the method according to the invention, at least two cooling elements can be regulated individually and in a speed-dependent manner. Furthermore, the electrical component is a transformer and the cooling element is a speed-selectable fan.

The invention is also characterized by the fact that the temperature and/or viscosity measured at the sensor, the calculated temperature distribution and the control values for the cooling element are transferred to a control room, wherein the control room independently controls the cooling element, if required, independently of the calculated temperature distribution and the control values for the cooling element derived therefrom.

Advantageously, it is provided that the control profile can be changed at any time and a new optimum operating state of the electrical component is calculated on the basis of the changed control profile. Thus, e.g., an operator can change the control profile, and thus the desired operating state of the electrical component, directly at the electrical component. With the change in control profile, the method according to the method determines the optimum cooling capacity for achieving the NOMINAL temperature on the basis of the ACTUAL temperature.

According to the invention, it is provided that an evaluating device is used for calculating the temperature distribution within the electrical component, wherein the evaluating unit can be connected to a sensor for measuring the temperature and/or viscosity of a coolant located in the cooling system and the evaluating unit controls the cooling element on the basis of the temperature distribution calculated.

Other advantageous embodiments of the abovementioned invention are disclosed in the subclaims. The present invention will be explained in greater detail by means of the figures following, in which:

DESCRIPTION OF THE INVENTION

Figure 1:
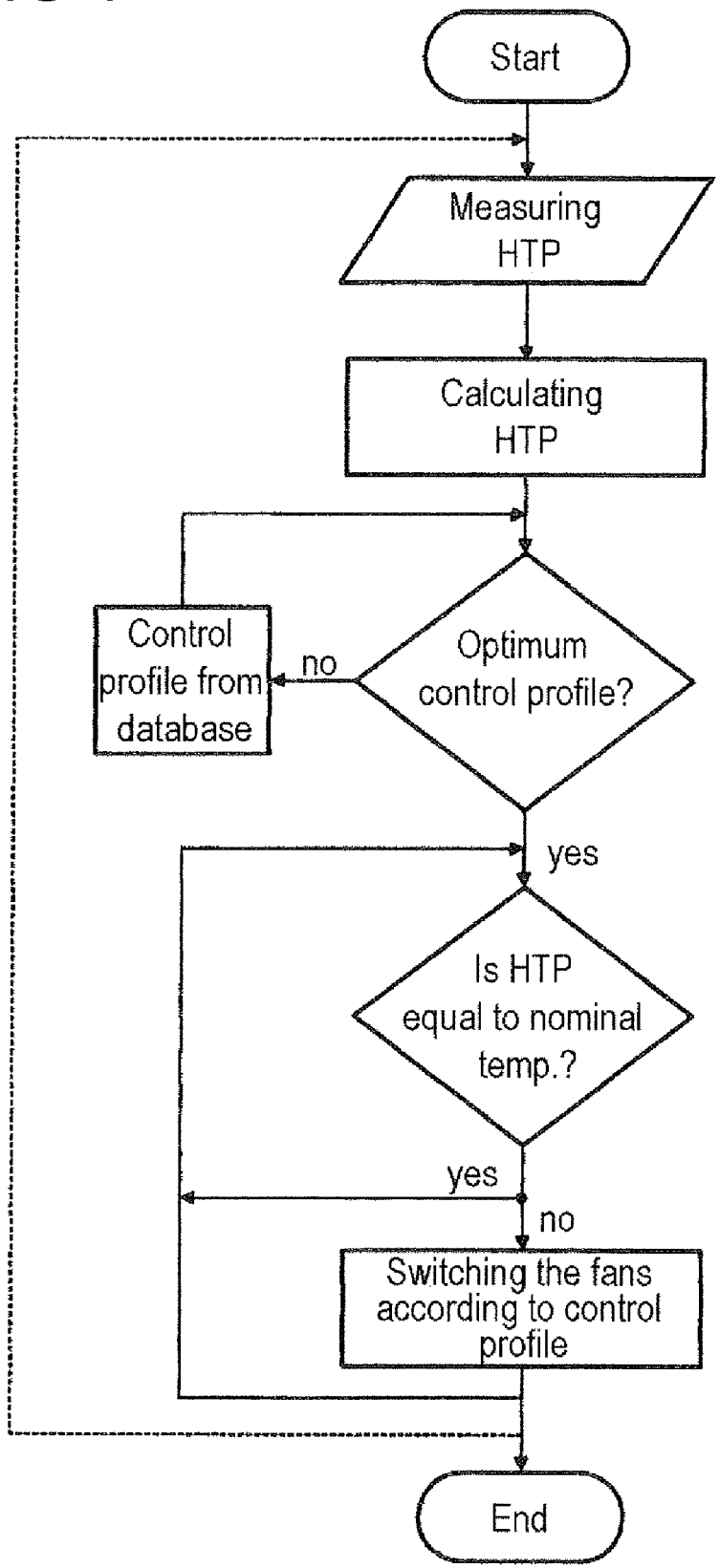
FIG. 1 shows a flowchart of the method according to the invention.

FIG. 1 shows a flowchart of the method according to the invention. On the basis of the temperature measured at the temperature sensor, the current hot spot temperature (HPT) is determined by means of the temperature value, defined in the International standard IEC standard IEC 60354. Furthermore, the ambient temperature is measured by means of a temperature sensor 4, the state of the oil (sensor for gas component in the oil 5.1; oil moisture content sensor 5.2) and the oil level within the tank is measured by a float 6. Hot spot temperature (HPT) thus determined is used for the control profile currently applied to the specific transformer 2 for determining the ACTUAL temperature of the industrial installation 1. For this purpose, the optimum control profile for the current operating state, the current life of the transformer 2 and the optimum operating states predetermined by the user are selected. If the optimum control profile is currently not the basis for the necessary process control, it is read out of a database. On the basis of the optimum control profile, the current hot spot temperature (HPT) is compared with the optimum temperature calculated on the basis of the control profile. In the case where the hot spot temperature (HPT) corresponds to the NOMINAL temperature on the basis of the control profile, the system monitors the hot spot temperature development by means of a control system 7 and does not switch in any fans 8.1, 8.2, 8.3 and/or pumps 9.1, 9.2, 9.3, 9.4 of the cooling circuit in the cooling system 10. If there is a deviation in the hot spot temperature (HPT) with respect to the NOMINAL temperature, the evaluation of the difference of the NOMINAL temperature with respect to the current hot spot temperature (HPT) is used for activating the connected fans 8.1, 8.2, 8.3 and/or pumps 9.1, 9.2, 9.3, 9.4 of the cooling circuit. The above-mentioned difference in the temperatures is taken as the basis for deciding that a cooling capacity must be additionally generated by the cooling system 10 for adapting the hot spot temperature (HPT) to the NOMINAL temperature. On the basis of the control profile and the number and performance of the fans 8.1, 8.2, 8.3 and/or pumps 9.1, 9.2, 9.3, 9.4, the control system 7 drives the fan or fans 8.1, 8.2, 8.3 and/or pumps 9.1, 9.2, 9.3, 9.4 with a corresponding speed or with a corresponding power, respectively. The forced use of pumps in the cooling system 10 leads to an increased circulation of the coolant in the cooling system 10 and thus to a heat removal to the environment. This form of cooling is very quiet. The use of fans 8.1, 8.2, 8.3 leads to an improved heat exchange of the coolant via the heat exchanger with the environmental air and is noisier, in contrast to cooling circuit pumps 9.1, 9.2, 9.3, 9.4.

Figure 2:
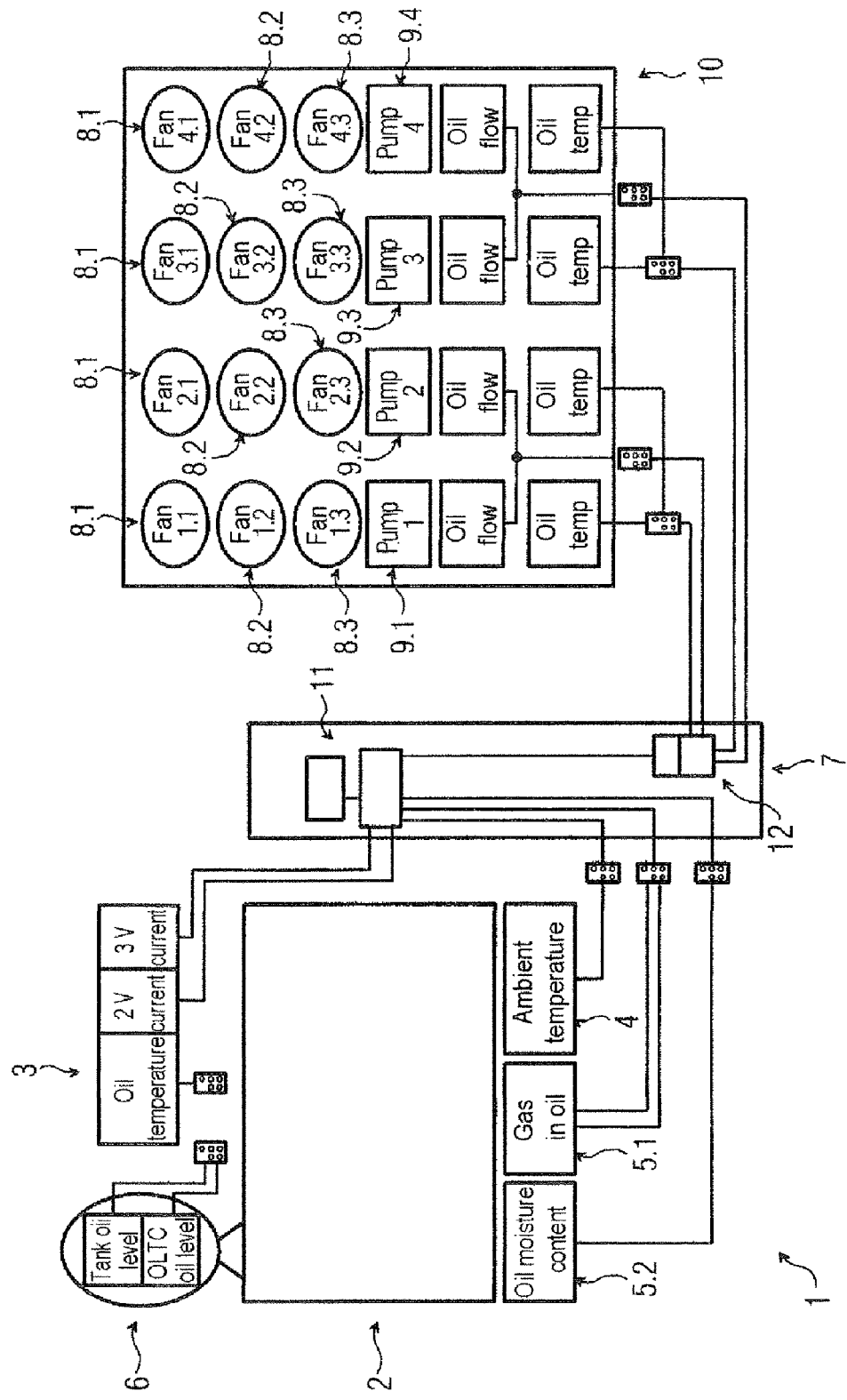
FIG. 2 shows the equivalent diagram of the device according to the invention.

FIG. 2 shows a circuit arrangement of the device according to the invention. At the transformer 2, the most varied sensors 3, 4, 5.1, 5.2 are located which provide information on the hot spot temperature (HPT), the ambient temperature, the gases dissolved in the transformer, the moisture content of the oil and the oil level. These sensors 3, 4, 5.1, 5.2, 6 convey the data measured by them to a central processing unit of the control system 7. On the basis of these available measurement data, this central processing unit calculates the current state of the transformer 2. This current state, thus determined, of the transformer 2 is compared with a control profile which is optimum for the current transformer state. If the measured measurement values deviate from the optimum values according to the control profile, the fans 8.1, 8.2, 8.3 and/or pumps 9.1, 9.2, 9.3, 9.4 of the cooling system 10 are driven in accordance with the basic control profile. The control profile ensures that the fans 8.1, 8.2, 8.3 and/or pumps 9.1, 9.2, 9.3, 9.4 are optimally matched with respect to their number and capacity to the required cooling capacity for adapting the ACTUAL temperature to the NOMINAL temperature.

For calculating the temperature distribution within the electrical component 2, an evaluating unit 11 is integrated in the control system 7. The evaluating unit 11 can be connected to at least one of the sensors 3, 4, 5.1, 5.2 for measuring e.g.

the oil temperature. The evaluating unit 11 controls the cooling element 8.1 on the basis of the calculated temperature distribution by means of a control unit 12 within the control system 7.

The invention claimed is:

1. A method for controlling a cooling of an industrial installation having at least one electrical component and a cooling system connected to the electrical component, the cooling system including at least one cooling element for cooling the electrical component, the method which comprises:
   measuring, with at least one sensor, a temperature of the electrical component and/or a viscosity of a coolant in a cooling circuit of the cooling system;
   calculating a temperature distribution within the electrical component based on the temperature measured with the sensor; and
   controlling the cooling element in dependence on the temperature distribution within the electrical component;
   thereby controlling the cooling element with rule-based applications and/or a neural network by way of a control profile with respect to a predetermined operating state of the electrical component;
   changing the control profile at any time between at least a first control profile and a second control profile;
   designing the first control profile to reduce a noise loading and almost eliminated a use of fans during a deviation between a NOMINAL and an ACTUAL temperature; and
   designing the second control profile to prevent a certain temperature from being exceeded within the electrical component.

2. The method according to claim 1, wherein the calculating step comprises calculating the temperature distribution within the electrical component on the basis of one or more of the following: the measured temperature, viscosity of the coolant, a flow rate of the coolant, and/or operating data used as a basis in developing the electrical component.

3. The method according to claim 1, which comprises measuring an ambient temperature and a current flowing through the electrical component and including the measurement in calculating the temperature distribution, and, when predetermined threshold values are exceeded, regulating the cooling element to a correspondingly higher cooling capacity on the basis of a respectively selected control profile.

4. The method according to claim 3, which comprises regulating the cooling element by way of the selected control profile so as to ensure a uniform temperature distribution within the electrical component.

5. The method according to claim 3, which comprises regulating the cooling element by way of the selected control profile so as not to exceed a predetermined maximum temperature distribution within the electrical component.

6. The method according to claim 1, which comprises regulating at least two cooling elements individually and in a speed-dependent manner.

7. The method according to claim 1, wherein the electrical component is a transformer.

8. The method according to claim 1, wherein the cooling element is a speed-selectable fan.

9. The method according to claim 1, wherein the cooling element is a speed-selectable pump within the cooling circuit of the cooling system.

10. The method according to claim 1, which comprises transmitting the temperature and/or the viscosity measured at the sensor, the calculated temperature distribution, and control values for the cooling element to a control room, and controlling the cooling element by way of the control room, if necessary, independently of the calculated temperature distribution and the control values for the cooling element derived therefrom.

11. In an industrial installation having at least one electrical component and a cooling system connected to the electrical component, the cooling system having a cooling circuit and at least one cooling element for cooling the electrical component, a device for controlling a cooling of the industrial installation, comprising:
   a control system having a control unit;
   an evaluation unit integrated in said control system, said evaluation unit calculating a temperature distribution within the electrical component;
   at least one sensor connected to said evaluating unit for measuring a temperature and/or a viscosity of a coolant in the cooling circuit of the cooling system, said evaluation unit controlling the cooling element based on the calculated temperature distribution by way of said control unit within said control system;
   said control system configured to carry out a method which comprises:
   measuring, with said at least one sensor, a temperature of the electrical component and/or a viscosity of a coolant in a cooling circuit of the cooling system,
   calculating a temperature distribution within the electrical component based on the temperature measured with said sensor, and
   controlling the cooling element in dependence on the temperature distribution within the electrical component,
   thereby controlling the cooling element with rule-based applications and/or a neuron network by way of a control profile with respect to a predetermined operating state of the electrical component,
   changing the control profile at any time between at least a first control profile and a second control profile, the first control profile designed to reduce a noise loading and almost dispense with a use of fans during a deviation between a NOMINAL and an ACTUAL temperature, and the second control profile designed to prevent a certain temperature from being exceeded within the electrical component, and
   calculating a new optimum operating state of the electrical component based on the second control profile.

* * * * *